(No Model.) 2 Sheets—Sheet 1.

T. J. HOUGHTON.
HARNESS ATTACHING DEVICE FOR VEHICLES.

No. 357,600. Patented Feb. 15, 1887.

WITNESSES
Geo. A. Lane
Albert Kautz

INVENTOR
Thomas J. Houghton
By Wm. R. Gerhart
His Atty.

(No Model.) 2 Sheets—Sheet 2.
T. J. HOUGHTON.
HARNESS ATTACHING DEVICE FOR VEHICLES.
No. 357,600. Patented Feb. 15, 1887.
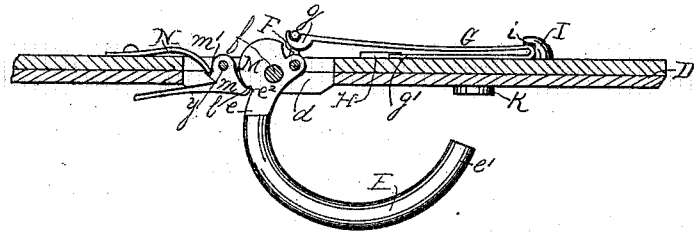
FIG-4-
WITNESSES
Geo. A. Lane
Albert Kautz
INVENTOR
Thomas J. Houghton
By Wm. R. Gerhart
His Atty.

UNITED STATES PATENT OFFICE.

THOMAS J. HOUGHTON, OF LANCASTER, PENNSYLVANIA.

HARNESS-ATTACHING DEVICE FOR VEHICLES.

SPECIFICATION forming part of Letters Patent No. 357,600, dated February 15, 1887.

Application filed September 3, 1886. Serial No. 212,592. (No model.)

*To all whom it may concern:*

Be it known that I, THOMAS J. HOUGHTON, a citizen of the United States, residing at Lancaster, in the county of Lancaster, State of Pennsylvania, have invented certain Improvements in Hitching Animals to Vehicles, of which the following is a specification.

My invention relates to the manner of hitching horses between the shafts of vehicles; and the objects of my improvements are, first, to prevent accidental variation of the length of the traces or breeching in hitching the horse in the shafts, and, second, to have the trace and breeching attached and the shaft supported at the same point on each side of the horse. The results I accomplish by the attainment of these objects are to always hitch up the animal with the same length of trace and breeching, so as to cause its movements to be immediately communicated to the vehicle, to prevent injury to the animal by making the breeching too tight and the danger of its being struck behind by making them too long, and to avoid the special fastening and loosening of the traces and breeching in hitching and unhitching. These objects I accomplish by the mechanism illustrated in the accompanying drawings, in which—

Figure 1:
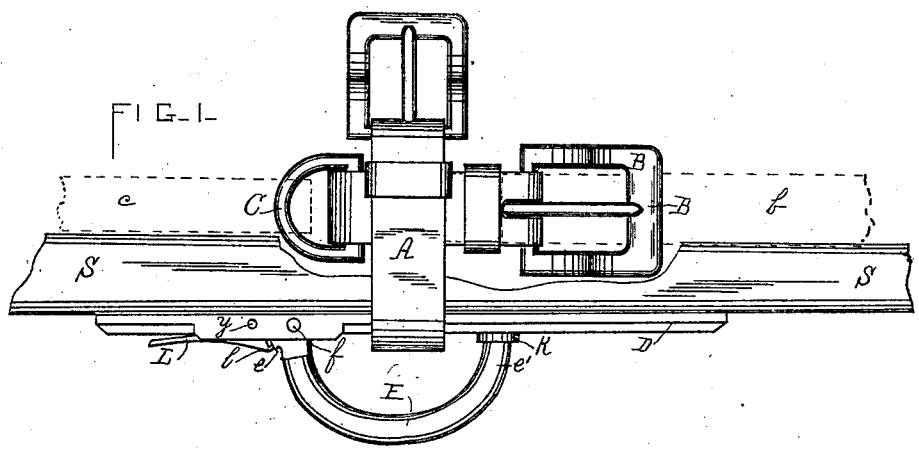
Figure 2:
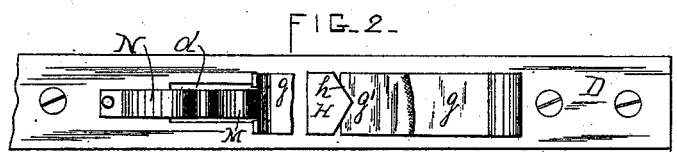
Figure 3:
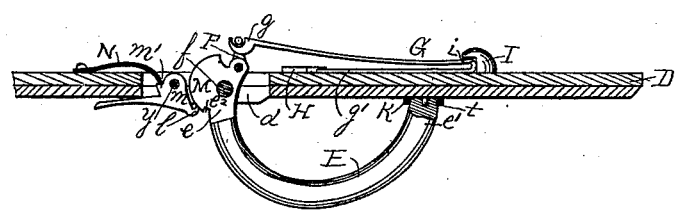

Figure 1 is a side view of my device; Fig. 2, a view of the inner face of the tug-clasp plate, with part of the spring cut away; Fig. 3, a side view of the clasp closed, part of the plate being cut away to show the operating mechanism; and Fig. 4, a view of the same with the clasp open to receive the tug.

Similar letters refer to similar parts throughout the several views.

The tug A, which supports the shaft S, has a buckle, B, attached to the front edge of its inner side, and a ring, C, to the rear edge, to which the trace $b$ and breeching $c$ (shown in dotted lines in Fig. 1) are respectively secured. On the lower face of the shaft S, where the tug embraces it, there is secured a plate, D, on the under side of which the tug-clasp E is fastened. The back end, $e$, of the clasp passes through and is pivoted in a slot, $d$, in the plate D, at $f$. This end $e$ is connected with the vibrating end $g$ of a spring, G, seated on the inner face of the plate, by the link F. The spring G is U-shaped, one arm, $g'$, resting on the plate and having a recess, $h$, cut into its outer end, which engages and bears against a correspondingly-shaped bearing-plate, H, fastened on the face of the plate, the other arm being free and actuating the clasp E to close when open. The bend of the spring rests in a recess, $i$, in the side of the lug I, fastened to the plate D. When closed, the front end, $e'$, of the clasp rests against the plate in a collar, K, fastened to the said plate, and has a hole in the end which engages a teat, $t$, on the face of the plate, in the center of the collar.

There is a trigger, L, pivoted in the slot $d$, at $y$, immediately back of the rear end of the clasp E, the front end of which is formed with a hooked catch, $l$, adapted to engage with a notch, $e^2$, formed in the base of a segmental lug, M, on the rear end of the clasp E. The trigger is located on the under side of the plate D and has an arm, $m$, through which the pivot $y$ passes, projecting into the slot, with a shoulder, $m'$, on the rear side, as a bearing for a spring, N, fastened to the inner face of the plate D and arranged to act thereon and to force the trigger into engagement with the notch $e^2$.

The parts of the mechanism projecting beyond the inner face of the plate D are received by a suitable opening in the bottom of the shaft.

When the clasp is opened to receive the tug, as shown in Fig. 4, it is brought into engagement with the trigger, and after the tug is in proper position, by pressure upon the trigger the clasp is free to be closed by the action of the spring G.

As will readily be seen, any forward or backward motion communicated by the animal to the vehicle is done through the tugs which support the shafts, and when the horse is hitched or unhitched the only thing necessary is to connect the tug with or disconnect it from the clasp.

I do not limit myself to the precise construction herein detailed, as it is evident that many slight changes in the construction and relative arrangement of the several parts of my device might be resorted to without departing from the spirit of my invention, but consider myself at liberty to make such changes as fairly fall within the spirit and scope of my invention.

Having fully described my invention, what I claim as new, and desire to secure by Letters Patent, is—

1. The combination, with the shaft-tug and shaft having a recess therein, of the slotted plate secured over said recess, the clasp pivoted near one end in the slot in the plate and constructed to have the other end opened to receive the shaft-tug, and the spring located in the recess and connected with the pivoted end of the clasp and acting to keep the other end thereof closed, substantially as and for the purpose specified.

2. The combination, with the shaft having a recess therein, of the slotted plate secured over said recess, the clasp pivoted in the slot in the plate and constructed to be opened to receive a shaft-tug, the spring located in the recess and connected with the clasp so as to act to keep the same closed, a trigger pivoted near the clasp, and a spring seated in the recess and actuating the said trigger to engage in a notch in the clasp to hold the same open, substantially as and for the purpose specified.

3. The combination, with the shaft, of a pivoted clasp adapted to be opened to receive a shaft-tug, a spring acting to close the clasp when open, a trigger pivoted near said clasp, and a spring actuating said trigger to engage with and hold the clasp open, substantially as and for the purpose set forth.

THOMAS J. HOUGHTON.

Witnesses:
GEO. A. LANE,
WM. R. GERHART,